United States Patent [19]
Sanderson

[11] Patent Number: 6,034,973
[45] Date of Patent: Mar. 7, 2000

[54] SUBSCRIBER LOOP EXTENSION SYSTEM FOR ISDN BASIC RATE INTERFACES

[75] Inventor: Lelon Wayne Sanderson, Fayetteville, Tenn.

[73] Assignee: Digi International, Inc., Minnetonka, Minn.

[21] Appl. No.: 08/827,543

[22] Filed: Mar. 28, 1997

[51] Int. Cl.[7] .................................................. H04J 3/12
[52] U.S. Cl. ........................ 370/524; 370/359; 370/419
[58] Field of Search .................................. 370/522, 524, 370/419, 420, 421, 463, 465, 257, 385, 241, 352, 353, 354, 355, 356, 357, 359, 423, 424; 379/1, 22, 24, 27, 30; 333/119, 131, 177

[56] References Cited

U.S. PATENT DOCUMENTS

| | | | |
|---|---|---|---|
| 4,087,657 | 5/1978 | Peoples | 379/24 |
| 4,195,201 | 3/1980 | Gryl, Jr. et al. | 336/96 |
| 4,307,267 | 12/1981 | Peoples | 324/605 |
| 4,433,208 | 2/1984 | Noetzelmann, Sr. | 336/90 |
| 4,975,672 | 12/1990 | McLyman | 336/198 |
| 5,204,860 | 4/1993 | Sparks | 370/463 |
| 5,208,846 | 5/1993 | Hammond et al. | 379/15 |
| 5,483,530 | 1/1996 | Davis et al. | 370/465 |
| 5,504,736 | 4/1996 | Cubbison, Jr. | 370/276 |
| 5,530,367 | 6/1996 | Bottman | 324/616 |
| 5,621,731 | 4/1997 | Dale et al. | 370/257 |
| 5,721,729 | 2/1998 | Klingman | 370/524 |
| 5,739,738 | 4/1998 | Hansen et al. | 336/229 |
| 5,784,558 | 7/1998 | Emerson et al. | 370/249 |
| 5,787,087 | 7/1998 | Visser et al. | 370/420 |

OTHER PUBLICATIONS

J. Green, "Voice Transmission Principles," *The Irwin Handbook of Telecommunications, 3rd Edition*, Irwin, Chicago, (1997), p. 38.

J. Green, "Outside Plant," *The Irwin Handbook of Telecommunications, 3rd Edititon.*, Irwin, Chicago, (1997), p. 166.

R. Chipman, Ph.D., "Introduction," *Schums's Outline of Theory and Problems of Transmission Lines*, McGraw–Hill, New York, (1968), p. 5.

R. Chipman, Ph.D., "Propagation Characteristics, Distributed Circuit Coefficients," *Schaum's Outline of Theory and Problems of Transmission Lines*, McGraw–Hill, New York, (1968), pp. 60–61.

*Primary Examiner*—Dang Ton
*Assistant Examiner*—Phirin Sam
*Attorney, Agent, or Firm*—Schwegman, Lundberg, Woessner & Kluth P.A.

[57] ABSTRACT

A system and method for reducing signal attenuation of integrated services digital network (ISDN) digital transmissions at the subscriber loop, thereby increasing the available subscriber loop range, is provided. An ISDN digital transmission system is used for transmitting and receiving digital information via a line termination at a central office. Customer premises equipment is coupled to a network termination (NT-1) within the customer premises, which is in turn coupled to interface the line termination at the central office. A plurality of inductive load coils are coupled in series with the two-wire subscriber loop ISDN BRI at predetermined distance intervals, which are calibrated to resonate the two-wire bus.

16 Claims, 6 Drawing Sheets

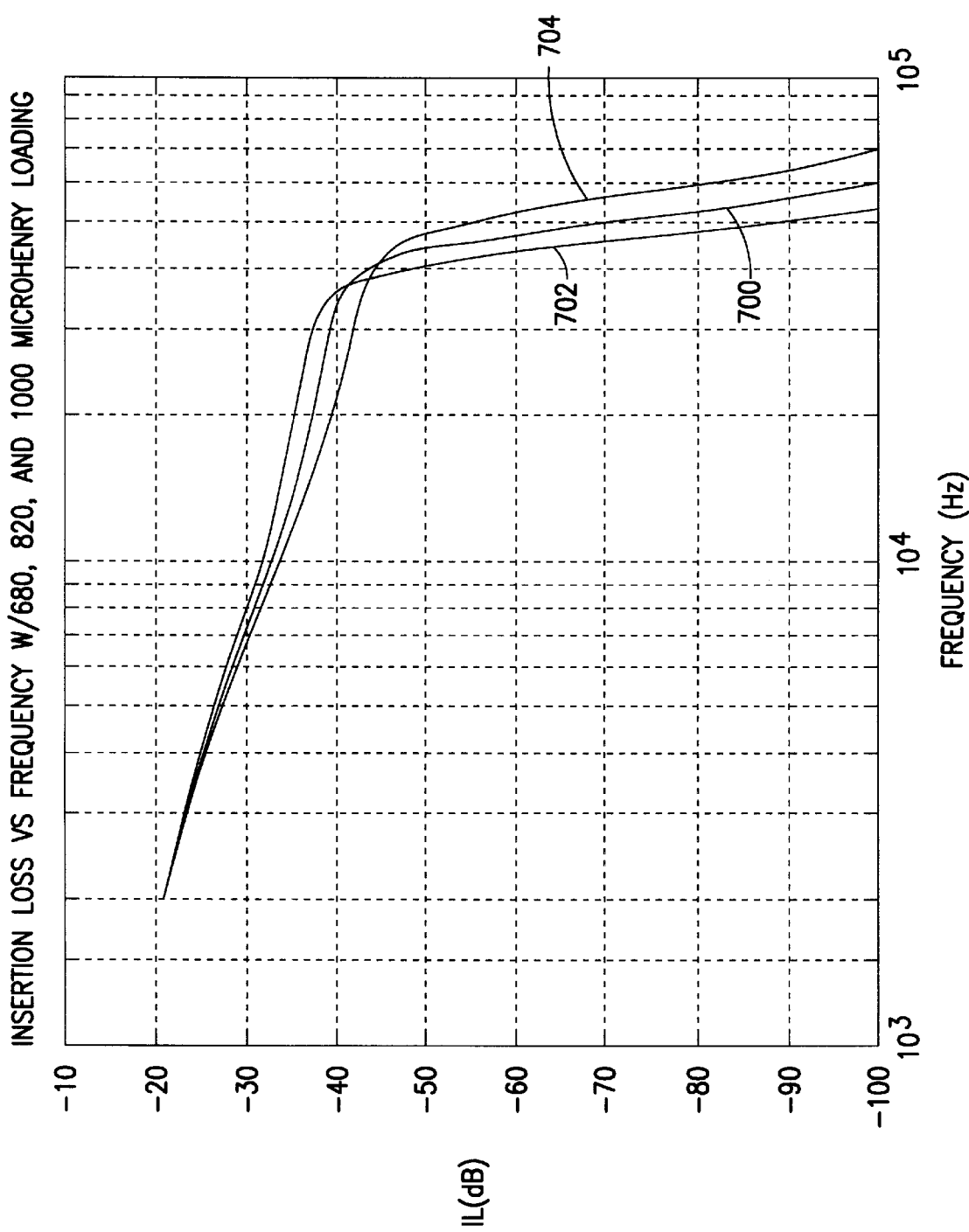

SUBSCRIBER LOOP EXTENSION SYSTEM FOR ISDN BASIC RATE INTERFACES

FIELD OF THE INVENTION

The present invention relates generally to digital telecommunications, and more particularly, to a system and method for reducing-signal attenuation of integrated services digital network (ISDN) digital transmissions at the subscriber loop.

BACKGROUND OF THE INVENTION

The introduction of digital communications into the telephone network has greatly increased the available signal bandwidth. A corresponding reduction in the amount of cable required to carry a number of telephone conversations carried by analog telephony methods was also realized. The massive increase in the reliance and demand of telephone systems in today's society has driven the need for this reduction in cable and increased signal bandwidth.

A number of different technologies have been devised to facilitate the advance of digital communications. Various signaling technologies have used frequency division multiplexing (FDM) to segment the available bandwidth. Separate signals are carried in each segment using digital signaling derived through a digital representation of an analog waveform. Time-division multiplexing (TDM) has been used with T-1 and other transmission facilities, where each of a multiplicity of channels gets an interleaved time segment in order that all of the channels share the transmission medium equally.

A relatively newer and emerging field of telecommunications is the integrated services digital network (ISDN), which is a standard established by the International Telecommunications Union-Telecommunications (ITU-T-T) Standardization Sector. ISDN integrates computer and communications technologies to provide a common, worldwide, digital network. ISDN telephone lines use digital communications protocols allowing digital connections at up to 128 Kbps and as many as three separate conversations at the same time through the same line as the twisted-pair copper telephone line that traditionally carried only one voice, or one computer/fax communication.

There are two basic types of ISDN service. Primary rate interface (PRI) is intended for users with large bandwidth capacity requirements and provides up to 23 64-Kbps data channels (B-channels) and 1 64-Kbps signaling channel (D-channel) in the U.S. Basic rate interface (BRI) consists of 2 64-Kbps B-channels and 116-Kbps D-channel for a total of 144 Kbps. This basic service is intended to meet the needs of most individual users.

One of the limiting factors in the deployment of the basic rate ISDN digital subscriber line is that the standard physical layer transceivers have a maximum loop reach of 18,000 feet of AWG26 cable. This is due to the attenuation of the signal strength over a distance caused by the electrical properties of the line itself, including the resistance, capacitance, inductance, and leakage conductance. Due to subscriber loop reach limitations, either additional subscriber loops are required to reach more remote subscribers, or repeaters are necessary.

Analog telephony transmission systems faced subscriber loop problems, as it was discovered that voice signals would travel with reduced loss, and with greater fidelity, if the distributed inductance of the line was increased without adversely changing the other distributed circuit coefficients. A practical alternative used in lieu of tackling the difficult process of increasing the uniformly distributed inductance of a line was to insert lumped inductance coils at various intervals along the line. Loop design balanced cost against transmission quality, and loading permitted the economy, in long telephone lines, of using smaller gauge copper wires than would otherwise have been needed to give the same electrical efficiency and quality of transmission.

Digital communications, however, has transmission characteristics different from those of existing analog telephony. This difference has resulted in a generally implemented ISDN communications installation procedure across the existing twisted-pair telephone wires, including removing all load coils from the line as basic rate ISDN service is installed. As previously indicated, BRI ISDN local loops are currently limited to a maximum loop reach of approximately 18,000 feet of AWG26 cable, which results in a large number of subscribers who are not accessible within the normal local subscriber loop.

One solution currently implemented in digital transmission lines is the use of repeater amplifiers in the long subscriber loops. Repeater amplifiers, however, are implemented at a cost of thousands of dollars per line. Furthermore, repeater amplifiers include active electronic devices, which decreases the field reliability of service and increases the cost of service maintenance. Another approach to lengthen the subscriber loop involves the use of non-standard transceivers at each end of the long loop, resulting in yet another costly installation.

Accordingly, there is a need in the digital communications industry for a transmission arrangement to increase the maximum subscriber loop reach which is inexpensive, easy to implement, and reliable. The present invention provides a system and method for reducing the loop loss on digital subscriber loops having component costs of only tens of dollars per subscriber line. Therefore, the present invention provides a low cost and reliable solution for reaching approximately 95 percent or more of potential digital communications customers without the use of active electronics coupled to the subscriber line. The present invention overcomes the aforementioned problems, and provides these and other advantages over the prior art.

SUMMARY OF THE INVENTION

The present invention is directed to a system and method for reducing signal attenuation of integrated services digital network (ISDN) digital transmissions at the subscriber loop, thereby increasing the available subscriber loop range.

In accordance with one embodiment of the invention, the present invention provides a integrated services digital network (ISDN) digital transmission system for transmitting and receiving digital information via a line termination at a central office. A customer premises having a plurality of terminal equipment devices is coupled to a first interface bus, and a network termination (NT-1) is coupled to the first interface bus within the customer premises. An ISDN interface is coupled to interface the line termination and the network termination (NT-1). The ISDN interface includes a two-wire bus, having a first connection for transmitting B-channel data of the ISDN interface, and a second connection for transmitting D-channel data of the ISDN interface. A plurality of inductive load coils are coupled in series with the first and second connections at predetermined distance intervals, which are calibrated to resonate the two-wire bus.

In accordance with another embodiment of the invention, a method for reducing signal attenuation on an integrated services digital network (ISDN) connection provided through a basic rate interface (BRI) is provided. Digital information is transmitted across a local loop of the ISDN connection linking a customer premises and a central office. The digital information is passed through one or more localized inductors which together approximate a distributed inductance. The localized inductors are calibrated to provide a distributed inductance which causes the ISDN connection at the local loop to resonate.

The above summary of the present invention is not intended to describe each illustrated embodiment or implementation of the present invention. This is the purpose of the figures and the associated discussion which follows.

BRIEF DESCRIPTION OF THE DRAWINGS

FIG. 7 is a graphical diagram illustrating the insertion loss versus frequency for a range of inductance load coil values for AWG24 cable in accordance with one embodiment of the present invention.

DETAILED DESCRIPTION OF THE ILLUSTRATED EMBODIMENTS

Figure 1:
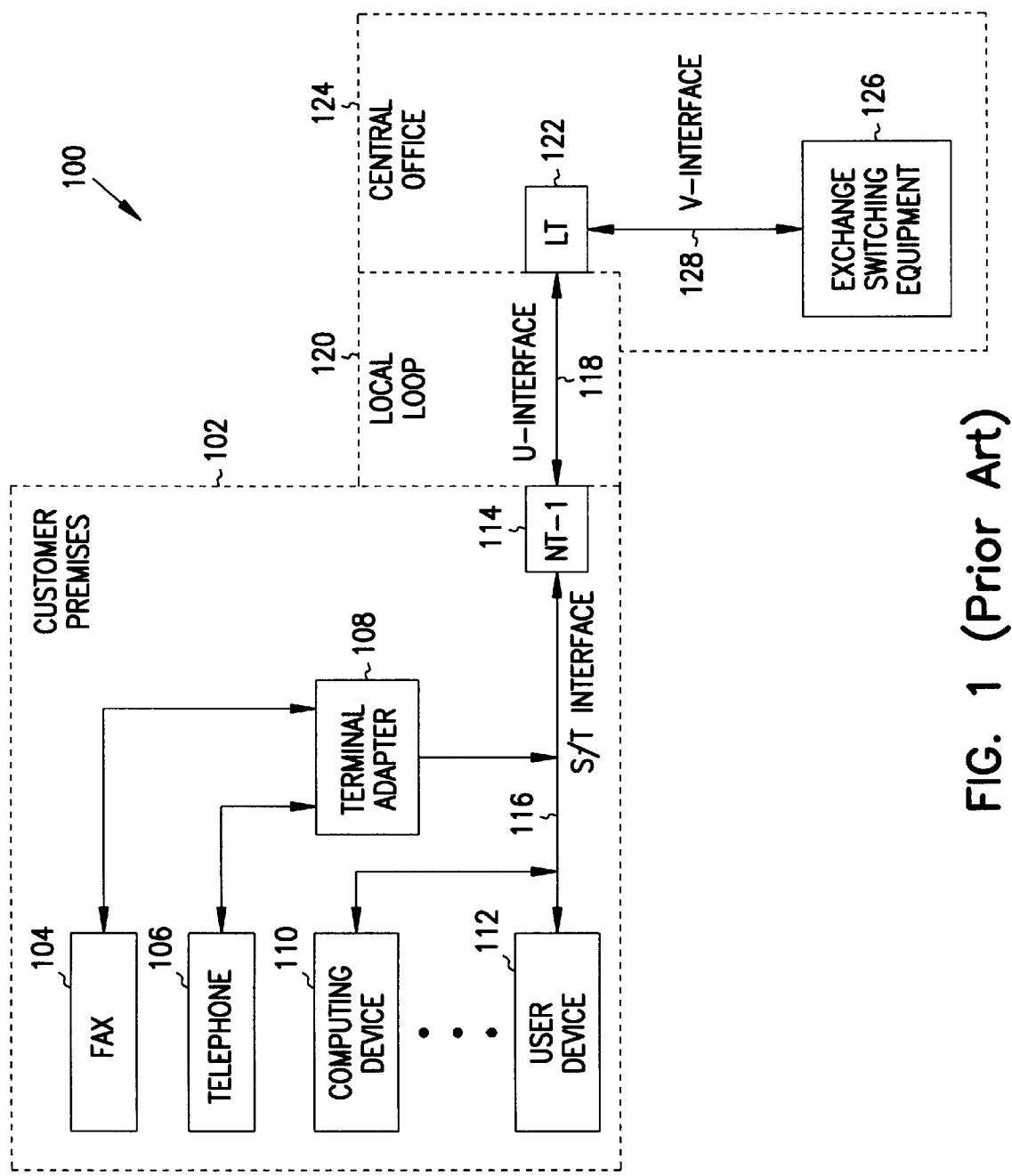
FIG. 1 is a block diagram of an ISDN environment to which the present invention applies.

FIG. 1 is a block diagram of an ISDN environment 100 in which the present invention applies. ISDN lines use digital, rather than analog, communications protocols. Within the customer premises 102 are various ISDN and non-ISDN terminal equipment devices. For example, an analog fax 104 and telephone 106 at the customer premises 102 are examples of communications devices at the customer premises 102 that are not ISDN-compatible. Such devices are coupled to a terminal adapter 108 which provides the ISDN interface at its output and an interface to the non-ISDN equipment at its input side.

ISDN-compatible equipment, referred to as terminal equipment (TE) includes, for example, computing device 110 as well as other ISDN-compatible user devices 112. The terminal equipment 110, 112, and the ISDN-compatible output of the terminal adapter 108, is provided to the network termination 1 (NT-1) 114 via the S/T interface 116. ISDN terminal equipment devices, such as computing device 110 and user device 112, are typically coupled to the network termination NT-1 114 through a network termination 2 (NT-2) which provides additional services, such as switching or data multiplexing at the customer premises 102. The S/T interface 116 is a 4-wire ISDN interface which can support multiple devices, and is a full-duplex interface including a pair of wires for received data, and a pair of wires for transmit data.

The NT-1 114 is basically a termination between the customer and the service provider, which converts the 2-wire U-interface 118 at the local loop 120. The NT-1 114 can also provide status as to the condition of the ISDN line connection, as well as network performance and integrity checks. The local loop 120 includes the 2-wire U-interface 118 that interconnects network termination NT-1 114 and a loop termination (LT) 122 at the central office 124. The connection to other switches within the network, illustrated as the exchange switching equipment 126, is referred to as the exchange termination function and occurs via the V-interface 128.

The U-interface 118 provides the interface between the central office 124 and the various customer premises 102. This connection typically runs under streets, or on telephone poles, into homes and businesses along the local subscriber loop 120. The U-interface has been implemented to be operable on the existing twisted-pair telephone network lines, and is designed to reach over relatively long distances between the central office 124 and the customer premises 102. All ISDN voice and data communications are coded into a single binary stream including pairs of bits expressed as 1 of 4 voltage levels, referred to as the 2B1Q line coding scheme. This scheme allows the interface to perform relatively well over distances up to approximately 18,000 feet. The present invention, however, allows the reach of the U-interface 118 at the local loop 120 to be increased, while maintaining the integrity of the information traversing the line.

Figure 2:
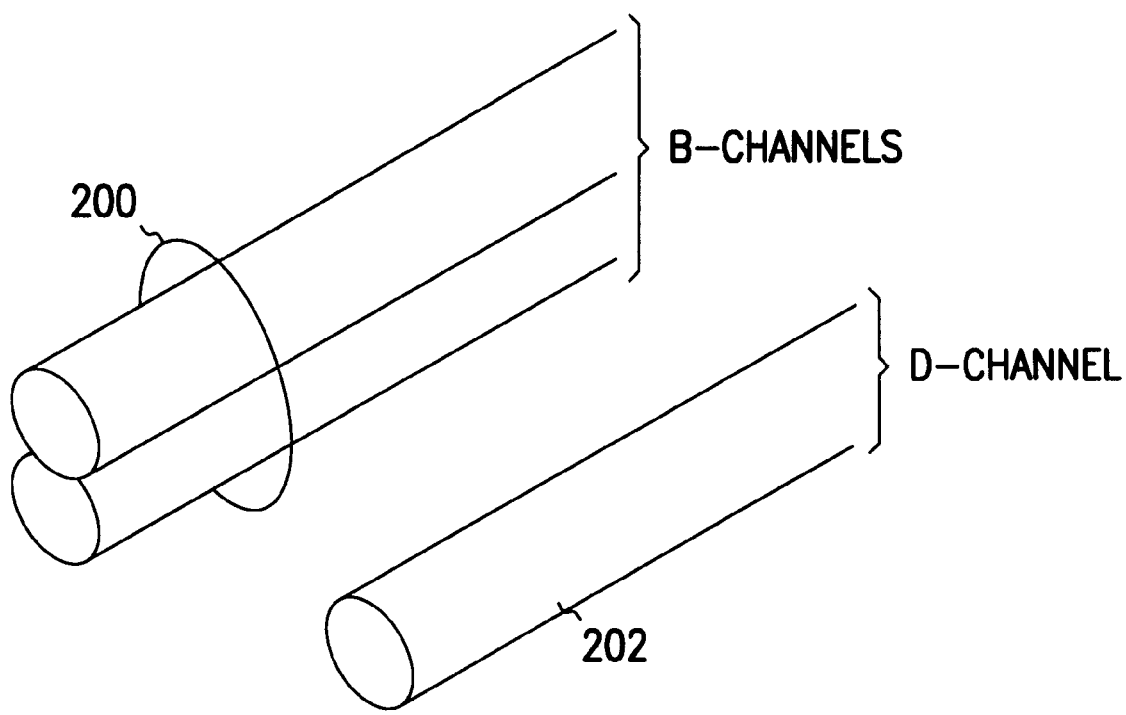
FIG. 2 illustrates the basic rate interface (BRI) as defined by the Telecommunications Standards Sector of the International Telecommunications Union.

FIG. 2 illustrates the basic rate interface (BRI) as defined by the Telecommunications Standards Sector of the International Telecommunications Union. BRI is defined as 2 64-Kbps bearer (B) channels 200, and 116-Kbps data (D) channel 202, often referred to as a 2B+D connection. The B channels 200 transmit user information such as voice and data information, while the D channel 202 provides control and signaling information such as the ISDN exchange with the number of the party to call. Therefore, a single BRI can carry two simultaneous voice or data conversations to the same or different locations, or can be combined for transmitting information at double the bandwidth.

In order to increase the distance at which the U-interface 118 can reach from the central office 124, the present invention reduces the attenuation on the U-interface 118 at the local loop 120 by providing circuitry which resonates the line at an approximate center of the spectrum for the BRI standard transceivers, which is approximately 40 Khz. The resonate frequency can be realized through the use of a circuit which balances the inductive and capacitive reactance components of the line, resulting in an input impedance of the network which is purely resistive, and the voltage and current at the network input terminals are in phase. The present invention enables the existing BRI ISDN equipment to communicate at up to 30,000 feet using AWG24 cable. Analogously, communication is greatly increased for other cable gauges as well.

Figure 3:
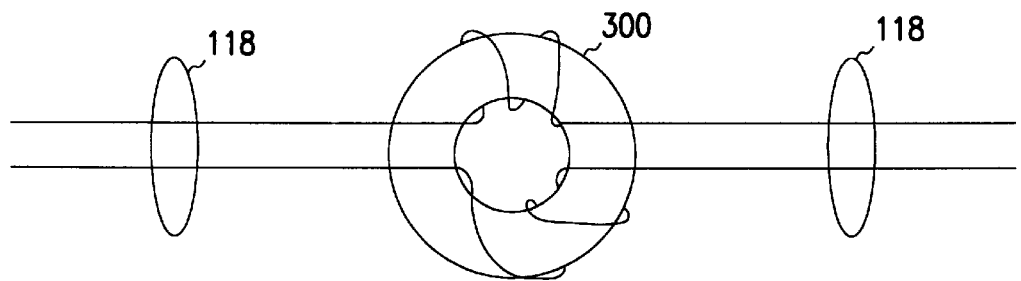
FIG. 3 is a general diagram of an inductance load coil in accordance with one embodiment of the present invention.

Referring now to FIG. 3, an inductance load coil 300 in accordance with one embodiment of the present invention is illustrated. The load coil 300 represents a lumped inductance, shown as a toroidal inductor formed by providing conductor windings on an conductive core, which simulates a distributed inductance over the U-interface 118. The load coil 300 is interleaved into the U-interface 118 in order to resonate the line thereby reducing the attenuation on the U-interface 118. As will be described below, this allows the local subscriber loop 120 to be increased while maintaining the integrity of the transmitted digital information.

Figure 4:
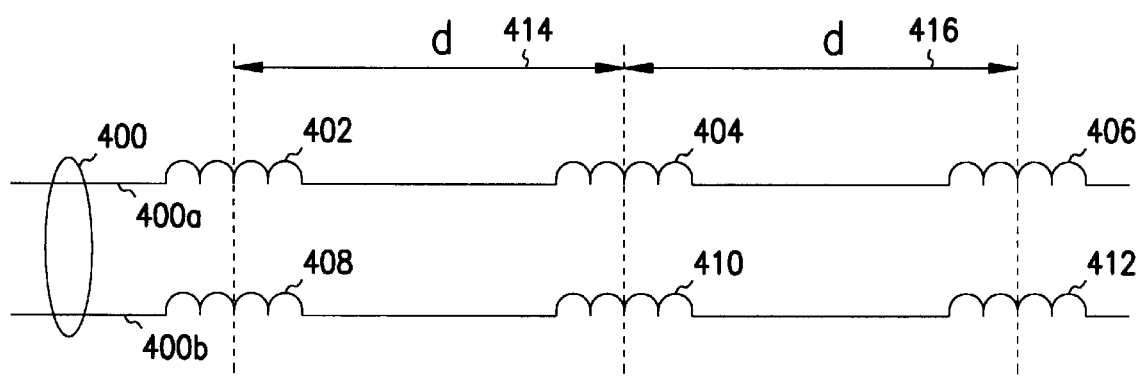
FIG. 4 is a more detailed embodiment of a U-interface in a digital telecommunications subscriber loop.

Referring now to FIG. 4, a more specific embodiment of a U-interface 400 is provided. The U-interface 400 is a 2-wire interface including lines 400*a* and 400*b*. A plurality of load coils 402, 404, and 406 on line 400*a*, and a plurality of load coils 408, 410 and 412 on line 400*b* comprise the inductance loading of the ISDN interface 400 illustrated in FIG. 4. The load coils on each line are in series, separated by a distance d represented by dimension lines 414 and 416. It should be recognized that a greater or lesser number of inductance load coils can be used on lines 400*a* and 400*b*, as will become readily apparent in accordance with the following description.

The twisted-pair U-interface 400 has inherent distributed transmission line parameters for wires having certain physical and electrical characteristics. For example, the standard copper wire used for the U-interface 400 can be calculated depending on the diameter of the wire used. This is based on the resistance, inductance, capacitance and conductance per mile for each of the standard wire gages at various temperatures and frequencies. The load coils 402–412 act to resonate with the distributed capacitance on the transmission line to provide a low pass filter effect. The resonant frequency is inversely proportional to the square root of the inductance times the capacitance as shown in equation 1 below:

$$f_R = \frac{1}{2\pi\sqrt{(L \times C)}}$$ [Eq. 1]

where $f_R$ is the resonant frequency;

L is the inductance of the line; and

C is the capacitance of the line.

The approximate center of the frequency spectrum for a 2B1Q signal for BRI standard transceivers is approximately 40 Khz. Other modulated signaling schemes, such as Quadrature Amplitude Modulation (QAM), which occupy a similar signal spectrum may be similarly benefited by the digital signal inductance loading scheme as described herein.

Using Equation 1 above, and targeting a 40 Khz resonant frequency, a resulting inductance of approximately 820 microhenries for the load coils 402–412, separated by a distance d of 3,000 feet, is calculated. The capacitive effect is generated by the cable pairs themselves, which act as large capacitors that attenuate signals as the frequency rises. Transmission line equations and computer simulations were used in connection with Equation 1 to determine a preferable range of inductance values particularly suited for the desired ISDN local loop extensions. In one embodiment of the invention, a range of preferable inductances for an approximate 40 Khz resonant frequency for load coils separated by approximately 3,000 feet is 680 microhenries to 1000 microhenries, as will be illustrated in the following diagrams.

Figure 5:
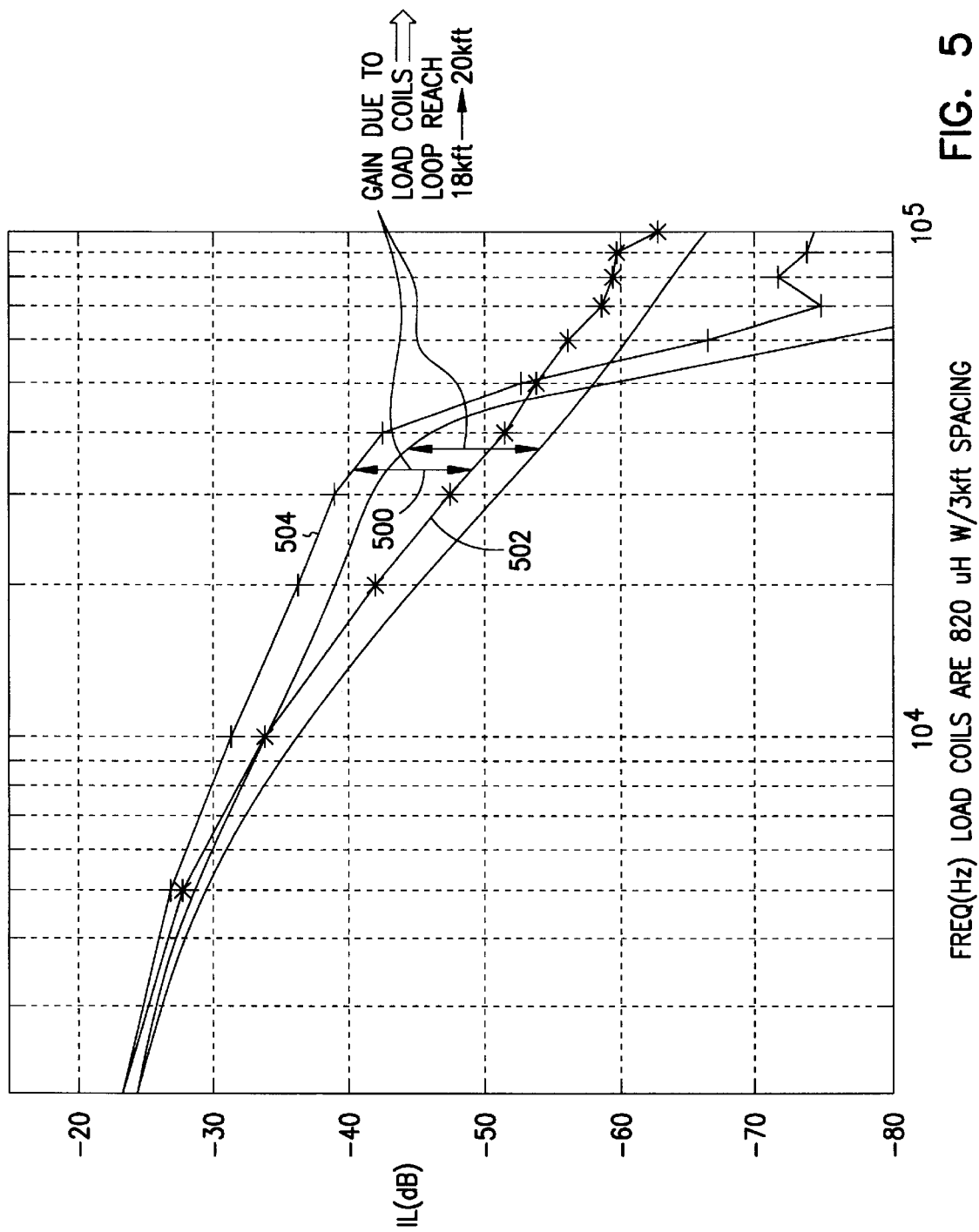
FIG. 5 is a graphical diagram illustrating the variance of the insertion loss of the cable with respect to frequency for a fixed length of AWG26 cable.

Referring now to FIG. 5, a graphical diagram illustrating the variance of the insertion loss of the cable with respect to frequency for a fixed length of cable is provided. FIG. 5 represents a plot of the insertion loss (IL) of the cable in dBs versus the frequency for a fixed length of cable, namely, an AWG26 cable in this example. Inductance load coils 300 having an approximate value of 820 microhenries were placed at approximately 3,000 feet spacings, which resulted in characteristics depicted by FIG. 5. FIG. 5 illustrates how the gain versus frequency is increased near 40 Khz when load coils of the appropriate values are applied to the cable. As can be seen by the distance depicted on line 500 between the original waveform 502 and the loaded waveform 504, for 18,000 feet of AWG26 cable, loop attenuation is decreased by approximately 9 dB near the 40 kHz range.

Figure 6:
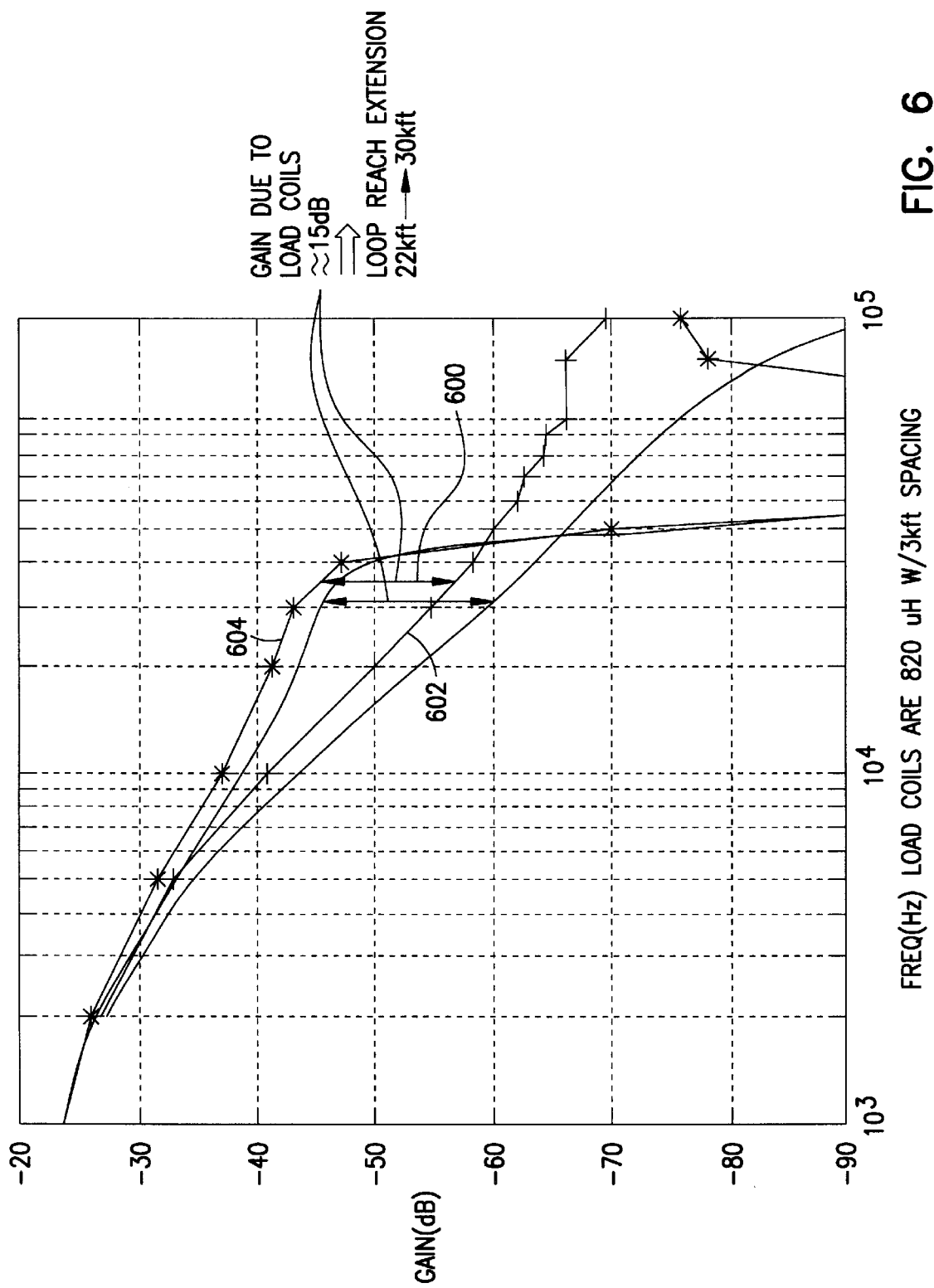
FIG. 6 illustrates another graphical example of the variance of the insertion loss of the cable with respect to frequency for a fixed length of AWG24 cable.

FIG. 6 illustrates another graphical example of the variance of the insertion loss of the cable with respect to frequency for a fixed length of cable. FIG. 6 represents a plot of the insertion loss (IL) of the cable versus the frequency for a fixed length of AWG24 cable. The local loop reach in this example is extended from approximately 22,000 feet to approximately 30,000 feet, resulting from a decrease in loop attenuation of approximately 15 dB near 40 Khz. This decrease can be seen by the distance depicted on line 600 between the original waveform 602 and the loaded waveform 604.

FIG. 7 is a graphical diagram illustrating the insertion loss versus frequency for a range of inductance load coil values for AWG24 cable in accordance with one embodiment of the present invention. Waveform 700 represents the signal corresponding to a line loaded with 820 microhenries of inductance at 3,000 feet spacings. Waveform 702 illustrates how the resonant frequency is decreased as the load inductance increases, as waveform 702 corresponds to a line loaded with 1000 microhenries of inductance at 3,000 feet spacings. Analogously, waveform 704 illustrates how the resonant frequency increases as the load inductance decreases, as waveform 704 corresponds to a line loaded with 680 microhenries of inductance at 3,000 feet spacings. This illustrates the variance of insertion loss using different inductance loading values.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. An integrated services digital network (ISDN) digital transmission system for transmitting and receiving digital information via a line termination at a central office, comprising:

(a) a customer premises having a plurality of terminal equipment devices coupled to a first interface bus;

(b) a network termination (NT-1), coupled to the first interface bus within the customer premises;

(c) an ISDN interface coupled to interface the line termination and the network termination (NT-1), comprising:

(1) a two-wire bus, having a first connection for transmitting B-channel data of the ISDN interface, and a second connection for transmitting D-channel data of the ISDN interface; and (2) a plurality of inductive load coils coupled in series with the first and second connections at predetermined distance intervals.

2. The ISDN digital information transmission system as in claim 1, wherein the inductive load coils comprise toroidal inductors formed via conductor windings on a conductive core.

3. The ISDN digital information transmission system as in claim 1, wherein the inductive load coils comprise inductors having a value in the approximate range of 680 microhenries to 1000 microhenries.

4. The ISDN digital information transmission system as in claim 1, wherein the predetermined distance intervals are each approximately 3000 feet.

5. The ISDN digital information transmission system as in claim 1, wherein all of the predetermined distance intervals include distances of approximately the same value.

6. The ISDN digital information transmission system as in claim 1, wherein the inductive load coils comprise inductors having a value of approximately 820 microhenries, and wherein the predetermined distance intervals are each approximately 3000 feet.

7. The ISDN digital information transmission system as in claim 1, wherein an inductance value of the inductance load coils and the predetermined distance intervals are selected so as to resonate the two-wire bus at a frequency approximately centered on a frequency spectrum for 2B1Q signaling for an ISDN basic rate interface.

8. The ISDN digital information transmission system as in claim 1, wherein an inductance value of the inductance load coils and the predetermined distance intervals are selected so as to resonate the two-wire bus at a frequency of approximately 40,000 Hz.

9. The ISDN digital information transmission system as in claim 1, wherein the plurality of inductive load coils comprises:

(a) first inductive load coils coupled in series to the first connection at predetermined distance intervals; and (b) second inductive load coils coupled in series to the second connection at the predetermined distance intervals.

10. The ISDN digital information transmission system as in claim 1, wherein the plurality of inductive load coils comprises a plurality of dual-input/dual-output load coils each coupled to both of the first and second connections at common locations along the two-wire bus.

11. The ISDN digital information transmission system as in claim 1, wherein the customer premises further comprises:

(a) a plurality of analog communication devices;

(b) a terminal adapter, coupled to receive analog communications signals from the analog communication devices and to provide digital signals to the first interface bus in response thereto.

12. The ISDN digital information transmission system as in claim 1, wherein the first interface bus comprises a four-wire S/T interface.

13. The ISDN digital information transmission system as in claim 1, wherein the first and second connections of the two-wire bus comprise twisted pair copper conductors selected from the group comprising: 26-gauge wire, 24-gauge wire, 22-gauge wire, 20-gauge wire, and 19-gauge wire.

14. The ISDN digital information transmission system as in claim 1, wherein the ISDN interface comprises a basic rate interface (BRI) having two B-channels of data and one D-channel of data.

15. A method for reducing signal attenuation on an integrated services digital network (ISDN) connection provided through a basic rate interface (BRI), comprising:

transmitting digital information across a local loop of the ISDN connection linking a customer premises and a central office;

passing the digital information through one or more localized inductors together approximating a distributed inductance; and calibrating the localized inductors to provide a distributed inductance to cause the ISDN connection at the local loop to resonate.

16. A method for reducing signal attenuation on a digital network architecture, comprising:

transmitting digital information across a local loop of the digital network architecture linking a customer premises and a central telephony office;

modulating the digital information at a frequency substantially equivalent to a center of a frequency spectrum for digital transmitters/receivers communicating the digital information;

transferring the digital information through one or more localized inductors which together approximate a distributed inductance; and calibrating the localized inductors to provide a distributed inductance to resonate lines on a local loop between the customer premises and the central telephony office at the frequency corresponding to the center of a frequency spectrum.

* * * * *